United States Patent [19]

Masaki

[11] Patent Number: 4,694,292
[45] Date of Patent: Sep. 15, 1987

[54] DIGITIZED DECODER-RECEIVER FOR RECEIVING CALL SIGNAL

[75] Inventor: Kazumi Masaki, Osaka, Japan
[73] Assignee: Ken Hayashibara, Okayama, Japan
[21] Appl. No.: 683,476
[22] Filed: Dec. 19, 1984

[30] Foreign Application Priority Data

Jan. 12, 1984 [JP] Japan .................................. 59-4081

[51] Int. Cl.$^4$ ............................................. H04B 7/00
[52] U.S. Cl. .................................. 340/825.44; 379/55;
379/375; 455/31
[58] Field of Search ...................... 340/825.44, 825.48,
340/825.54, 825.01, 543, 825.69, 825.67; 179/2
E, 2 EB, 82, 99 P, 2 A; 455/31, 140; 379/56, 55,
375

[56] References Cited

U.S. PATENT DOCUMENTS

| | | | |
|---|---|---|---|
| 2,812,509 | 11/1957 | Phelps | 340/825.01 |
| 3,181,162 | 4/1965 | Cameron | 340/825.67 |
| 3,387,270 | 6/1968 | Adlhoch et al. | 340/825.67 |
| 3,735,351 | 5/1973 | Macheel | 340/825.44 |
| 3,909,826 | 9/1975 | Schildmeier et al. | 340/543 |
| 3,973,200 | 8/1976 | Akerberg | 340/825.49 |
| 4,173,016 | 10/1979 | Dickson | 340/825.44 |
| 4,213,009 | 7/1980 | Suzuki | 455/31 |
| 4,232,296 | 11/1980 | Filipovic | 340/825.62 |
| 4,301,335 | 11/1981 | Jucker et al. | 179/84 L |
| 4,426,637 | 1/1984 | Apple et al. | 340/825.69 |

Primary Examiner—Donald J. Yusko
Attorney, Agent, or Firm—Browdy and Neimark

[57] ABSTRACT

A novel method for receiving a numerical call signal which comprises assigning a certain call number to a specified person; transmitting an electromagnetic wave carrying the call number as the number of impulse; receiving the electromagnetic wave with a receiver, more particularly, a portable receiver; decoding the electromagnetic wave into low-frequency impulses of the number corresponding to the call number; and driving an alarm with the low-frequency impulses to call out the specified person.

4 Claims, 9 Drawing Figures

DIGITIZED DECODER-RECEIVER FOR RECEIVING CALL SIGNAL

FIELD OF THE INVENTION

The present invention belongs to the field of electro-communication.

The present invention provides a method for calling out specified person(s) comprising receiving a transmitted low-frequency or high-frequency current carrying a certain numerical call signal with a portable receiver, and permitting specified person(s) assigned with the call signal to push a button on the receiver.

BRIEF DESCRIPTION OF THE DRAWING FIGURES

The drawing figures show several embodiments according to the present invention.

FIG. 1 shows the bock diagram of a transmitting circuit;

FIG. 2, the block diagram of a receiving circuit;

FIG. 3, the number-detecting circuit in the receiver;

FIG. 4, the whole wiring diagram of the receiver;

FIGS. 5 and 6, the waveforms of the received signals;

FIG. 7, the output waveform of the transmitter;

FIG. 8, the waveform shown in FIG. 7 on receiving; and

FIG. 9, the wiring diagram of an oscillator to distinguish the reception.

In the drawing figures, (1) indicates numerical dial; (2), oscillator; (3), audio generator; (4), amplifier; (5) transmitting antenna; (6), receiving antenna; (7), automatic gain control amplifier; (8), decoder; (9), calling alarm; (10), loudspeaker etc; SCR, thyristor; C, capacitance; SET, set/reset circuit; R, resistance; T, time constant circuit; J, transistor; D, diode; B, power source; and S, response push button.

DETAILED DESCRIPTION OF THE INVENTION

Figure 1:
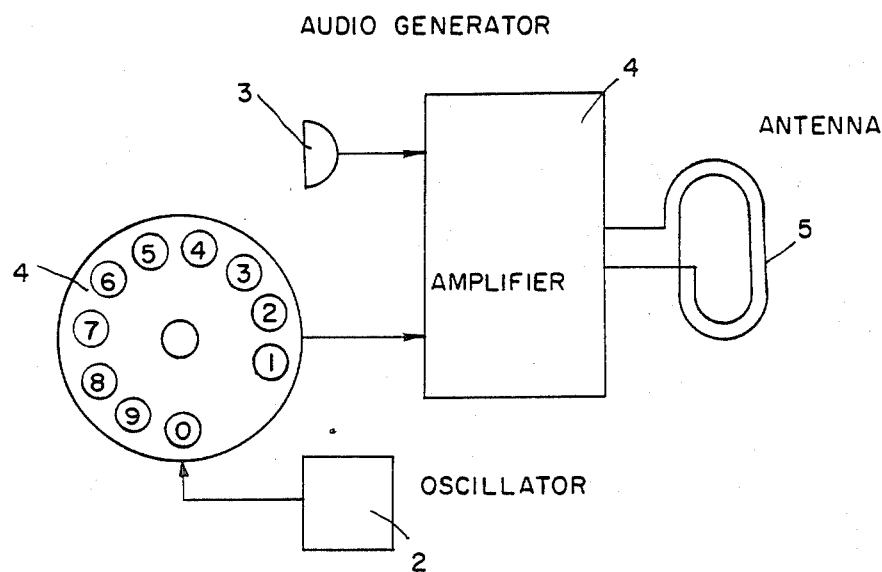

The method for receiving a numerical call signal according to the present invention will be explained in sequence:

(1) In the method according to the invention, a certain call number is assigned to specified person(s), and the person(s) is called out with this call number.

An impulse call signal carrying the call number as the number of impulses is first transmitted in the order of its digits by a transmitter by breaking a continuous radiation of low-frequency or high-frequency wave, or radiating either wave for the period equivalent to the width of the impulses.

(2) The transmitted signal is received with a portable receiver having an automatic gain control amplifier, and charged as low-frequency impulse to a decoder using a counting integrated circuit, after which the output terminal of the decoder corresponding to the number of the impulses is broken and kept intact for a prescribed time.

(3) By supplying the low-frequency impulses to the decoder and a set/reset circuit, a capacitance connected to the base circuit of a transistor in the set/reset circuit is charged with the first impulse of the call signal, and the charge voltage across the capacitance conducts the transistor to maximize the voltage signal across the load resistance in the collector circuit, as well as to minimize the collector voltage against ground. The minimized voltage is counted as the voltage for setting the decoder from the first impulse of the call signal.

(4) At the end of the call signal, a capacitance in the base circuit of the transistor is discharged by the resistance in parallel to cutoff the transistor. The output terminal of the decoder is, however, kept intact for a period determined by the time constant of the capacitance and resistance.

(5) A RC integrating circuit is charged with the low-frequency impulse supplied from the output terminal of the decoder through a diode or a resistance. Although the increase in voltage of the integrating circuit during the pulse counting at the output terminal of the decoder is relatively small, the charge voltage is increased to a level sufficient to trigger a thyristor, and promptly charges a capacitance in the cathode circuit since the charging time of the integrating circuit is prolonged by several-folds than the width of the low-frequency pulse by the time constant of the capacitance and resistance.

(6) Another circuit having the same construction as connected to the output terminal of the decoder is cascaded, and the thyristor in the circuit discharges the capacitance in the pre-stage cathode circuit to sequentially shift down the digits of the call signal. The discharge of the lowest digit of the call signal supplies power to an alarm, such as buzzer or bell.

(7) By pushing a button in response to the alarm, a resonance circuit immediately receives a current and oscillates to transmit an impulse to distinguish the reception to the transmitter, after which one can receive the information from the transmittor as audio signal.

Referring now to the drawings for a more complete understanding of the invention, FIG. 1 shows the block diagram of the transmitting circuit according to the present invention, wherein the output of oscillator (2) is charged as impulse to amplifier (4) by turning numerical dial (1), and wherein the output of the amplifier is converted into a high-frequency or low-frequency impulse call signal and transmitted with transmitting antenna (5). Audio generator (3) is provided to generate an audio signal.

Figure 2:
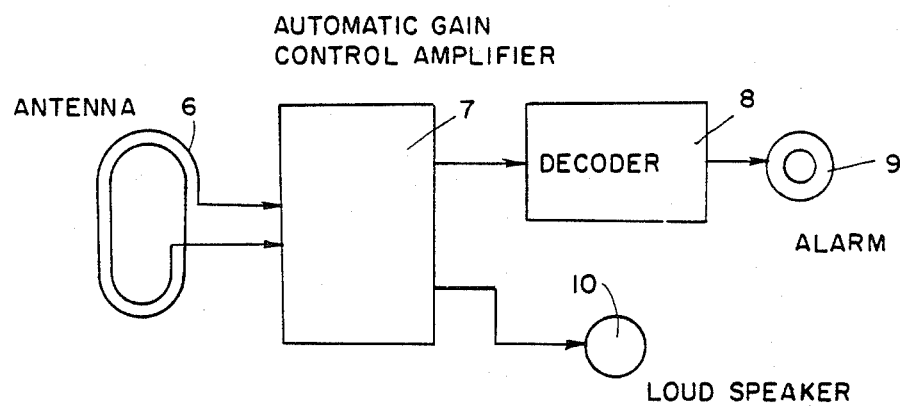

FIG. 2 shows the block diagram of the receiving circuit according to the present invention. An electromagnetic wave carrying the call number is caught by receiving antenna (6), charged to automatic gain control amplifier (7), and converted into a digital signal by decoder (8). The output of the decoder is coupled to calling alarm (9), such as a buzzer or bell, so that the calling alarm is rung when the number of the impulses is identified with the call number assigned to the receiver. After pushing the response push button, the respondent can receive an instruction or message as an audio signal with loudspeaker or receiver (10).

Figure 3:
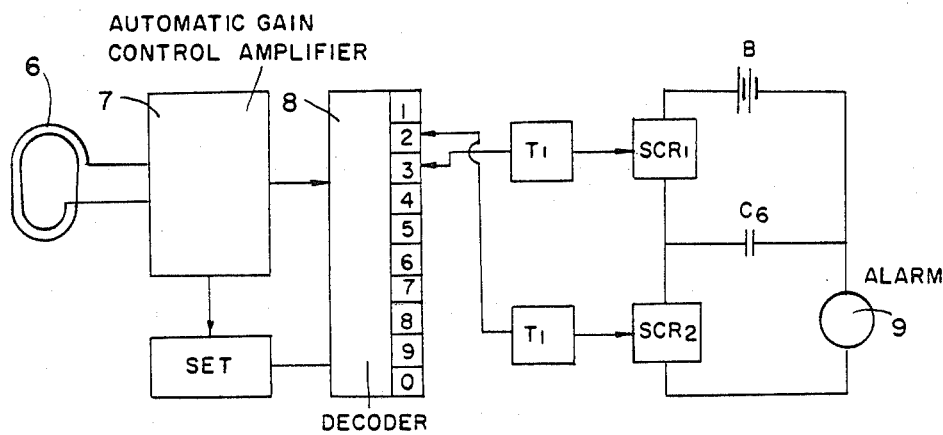

FIG. 3 shows the number detecting circuit of the receiver according to the invention, wherein the impulse call signal received with receiving antenna (6) is converted into a voltage signal by automatic gain control amplifier (7) to drive decoder (8).

Now suppose that the tens digit of a certain call number is "3", the output terminal "3" of decoder (8) is shifted to "hot" state, and a current signal flows into time constant circuit $T_1$ to trigger thyristor $SCR_1$. The current from power supply B charges capacitance $C_6$ through thyristor $SCR_1$ to break the current of thyristor $SCR_1$.

Further suppose that the units digit of the call number is "2", the output terminal "2" of decoder (8) is shifted to "hot" state, and the current signal flows into time constant circuit $T_2$ to trigger thyristor $SCR_2$ and discharge capacitance $C_6$. This discharge drives alarm (9), such as buzzer or bell, to generate an audio alarm.

Set/reset circuit SET is reset to "zero" state whenever it receives the impulse corresponding to the units digit of a call number.

Figure 4:
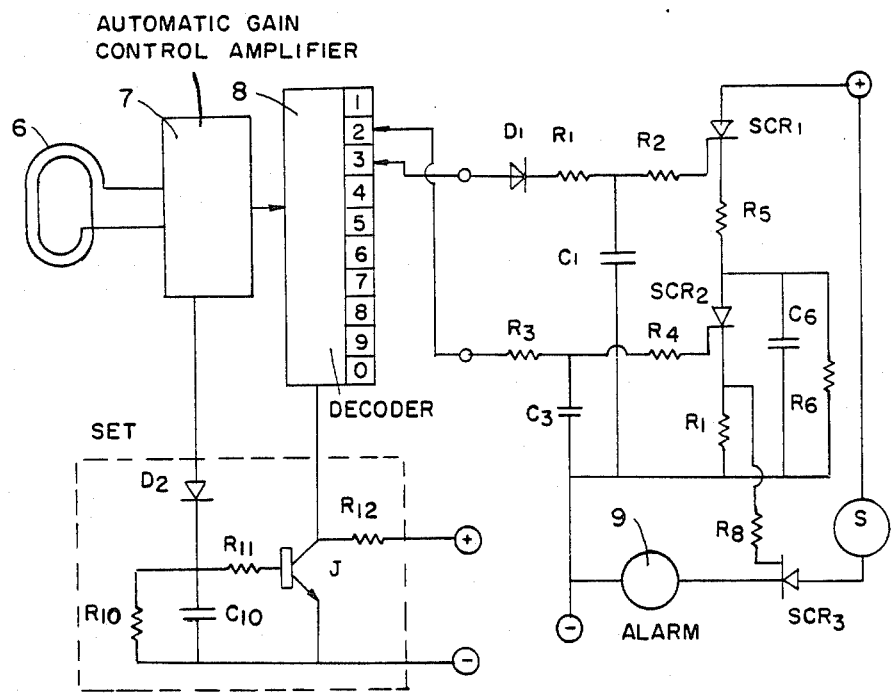

FIG. 4 shows the complete wiring diagram of the receiver according to the present invention, wherein an impulse call signal caught by receiving antenna (6) is converted into an impulse signal by automatic gain control amplifier (7), and then charged to decoder (8) as well as to diode $D_2$ of set/reset circuit SET.

Figure 5:
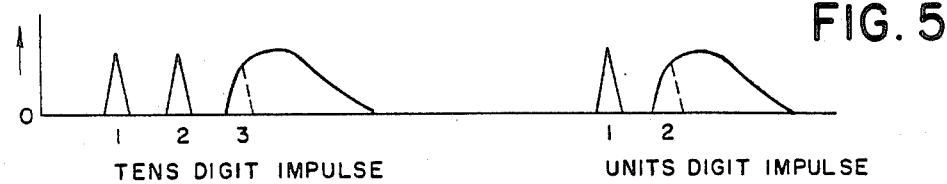
Figure 6:
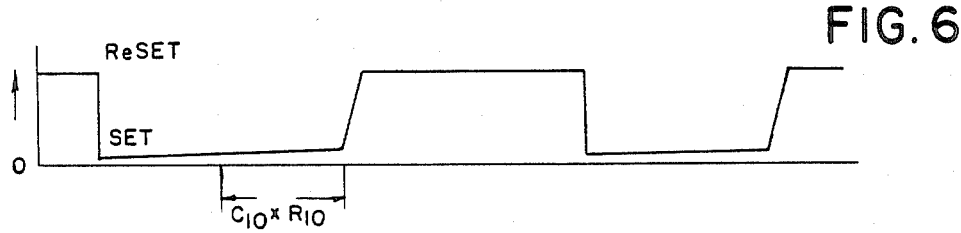

When the first impulse corresponding to the tens digit of the impulse signal is charged as shown in FIG. 5, the current is charged in capacitance $C_{10}$ in set/reset circuit SET, and the base voltage of transistor J increases and conducts transistor J to maximize its collector current. The maximum voltage signal appears across resistance $R_{12}$, and the collector voltage decreases to an approximately zero level. As shown in FIG. 6, the first impulse corresponding to the tens digit of the call number immediately shifts the voltage from "set" state to "reset" state, and decoder (8) counts the number of the impulses.

At the end of three impulses corresponding to the tens digit of the call number as shown in FIG.5, the discharge of capacitance $C_{10}$ in set/reset circuit SET through resistance $R_{10}$ breaks the collector current of transistor J, and the voltage at point "P" in the transistor circuit increases to reset decoder (8) into "set" and "zero" state. Since the cutoff of transistor J is retarded by the time determined by the time constant of capacitance $C_{10}$ and resistance $R_{10}$ as shown in FIG. 6 after receiving the last impulse of the call signal, the "set" and "reset" of decoder (8) are retarded similarly. The received signal wave in FIGS. 5 and 6 indicate "32".

As regards the function to ring alarm (9) to call out the person(s) "32", the signal corresponding to the tens digit "3" comes into decoder (8), and the output terminal "3" is shifted to "hot" state. If this is longer than the width of the impulse, then the signal is charged in capacitance $C_1$ through diode $D_1$ and resistance $R_1$. When the voltage signal across the capacitance reaches a prescribed level, thyristor $SCR_1$ comes into conduction, and capacitance $C_6$ is charged through resistance $R_5$ to break the conduction of thyristor $SCR_1$.

When the signal corresponding to the units digit "2" enters into decoder (8), the output terminal "2" of the decoder is shifted to "hot" state, and the signal charges capacitance $C_3$ through resistance $R_3$. When the charge voltage reaches a prescribed level and triggers thyristor $SCR_2$ to discharge capacitance $C_6$, the voltage signal across resistance $R_7$ conducts thyristor $SCR_3$ to ring alarm (9). The ringing continues until response push button S is pushed.

Figure 7:
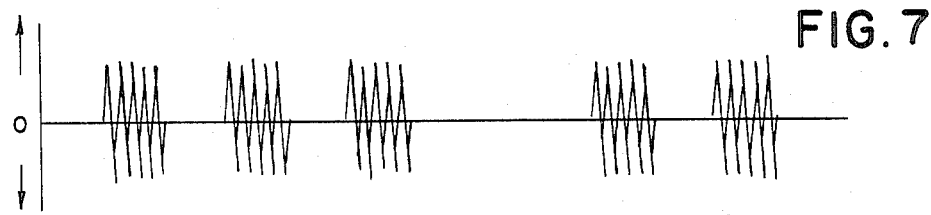
Figure 8:
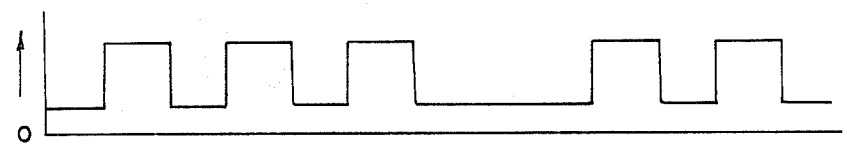

FIG. 7 indicates the output waveform of the transmittor, which carries plural impulses of the number corresponding to a certain call number. FIG. 8 shows the convex pulse waveform of the transmitted waveform shown in FIG. 7 on receiving, which drives a counting circuit.

Alternatively, a procedure wherein a continuous transmission of an impulse wave is broken for the times corresponding to the call number may be used. This procedure has an advantage that automatic gain control amplifier (7) of the receiver can be much more smoothly operated. In this case, the received signal has a cancavo pulse waveform.

Figure 9:
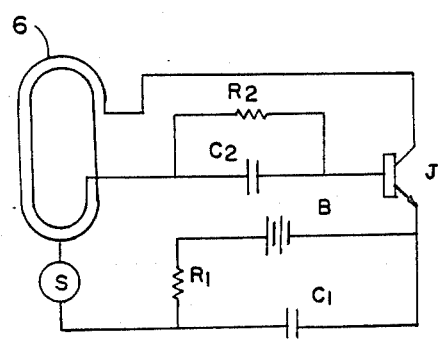

FIG. 9 shows the oscillator circuit to distinguish the reception, wherein the charge in capacitance C supplied from power supply B through resistance R flows to transistor J through receiving antenna (6) to effect oscillation and transmit an impulse to the transmitter.

It is effective to equip this circuit in the receiver.

While I have shown and described particular embodiments of my invention, it will be obvious to those skilled in the art that various changes and modifications may be made without departing from my invention in its broader aspects and I, therefore, intend in the appended claims to cover all such changes and modification as fall within the true spirit and scope of my invention.

I claim:

1. A portable device for receiving a transmitted call signal containing a first digit and a second digit, said call signal being an electromagnetic wave that carries a specific sequence of pulses having a first pulse and a last pulse, and having been preassigned as a decimal number to a particular person(s), comprising:

(a) a dc source for supplying power to said device;
 (b) antenna means for picking up said call signal once it has been transmitted;
 (c) an automatic gain control amplifier having an input terminal connected to said antenna means and at least one output terminal, said amplifier including means for converting said call signal, picked up by said antenna means, into a sequence of pulses;
 (d) decoder means for counting the number of pulses in said sequence of pulses and activating a specific output in accordance with said number of pulses, said decoder means having a set/reset terminal and a first input terminal connected to said output terminal of said automatic gain control amplifier;
 (e) a grounded-emitter transistor, having a base and a collector, for controlling said decoder means, said base of said transistor being connected to said output terminal of said automatic gain control amplifier and a first capacitor that cuts off said transistor at the end of said sequence of pulses, and said collector of said transistor being connected to said set/reset terminal of said decoder means for initializing said decoder means when said first pulse of said sequence of pulses reaches said input terminal of said decoder means;
 (f) a second capacitor which is charged when said first digit of said call signal is received and discharged when said second digit of said call signal is received;
 (g) an RC-integrating circuit having a time constant sufficiently longer than the time duration of said sequence of pulses that charge said second capacitor;
 (h) a controlled rectifier having a main current path and a second current path through a gate to said second capacitor, said output terminal of said decoder means charging said second capacitor through said main current path when said first digit of said call signal is received and discharging said second capacitor through said RC integrating circuit when said second digit of said called signal is received; and
 (i) means for alarming said particular person(s), said means for alarming being connected in series with said second capacitor so that when said second capacitor discharges, said means for alarming is activated.

2. The device of claim 1, wherein said alarming means comprises a buzzer.

3. The device of claim 1, wherein said alarming means comprises a bell.

4. The device of claim 1, wherein at least two pairs of components (f) and (g) are used in a cascaded manner.

* * * * *